(12) United States Patent
Foster et al.

(10) Patent No.: US 8,145,393 B2
(45) Date of Patent: Mar. 27, 2012

(54) SYSTEM AND METHOD EMPLOYING SHORT RANGE COMMUNICATIONS FOR INTERACTIVELY COORDINATING UNLOADING OPERATIONS BETWEEN A HARVESTER AND A GRAIN TRANSPORT

(75) Inventors: Christopher A. Foster, Akron, PA (US); Riccardo Morselli, Spilamberto (IT); Olivier Arnel Vanhercke, Nieuwpoort (BE); Guoping Wang, Naperville, IL (US); Bart M. A. Missotten, Herent (BE); Bert Juul Frans Paquet, Bruges (BE); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 697 days.

(21) Appl. No.: 12/284,310

(22) Filed: Sep. 17, 2008

(65) Prior Publication Data

US 2010/0070145 A1  Mar. 18, 2010

(51) Int. Cl.
*G06G 7/70* (2006.01)

(52) U.S. Cl. ............ 701/50; 460/113; 701/1; 701/200; 701/213

(58) Field of Classification Search .......... 701/50, 701/200, 213; 460/213
See application file for complete search history.

(56) References Cited

U.S. PATENT DOCUMENTS

| | | | | |
|---|---|---|---|---|
| 5,575,316 | A | 11/1996 | Pollklas | 141/198 |
| 5,749,783 | A | 5/1998 | Pollklas | 460/119 |
| 6,216,071 | B1 | 4/2001 | Motz | 701/50 |
| 6,587,772 | B2 * | 7/2003 | Behnke | 701/50 |
| 6,682,416 | B2 * | 1/2004 | Behnke et al. | 460/114 |
| 6,732,024 | B2 | 5/2004 | Wilhelm Rekow et al. | 701/26 |
| 6,943,824 | B2 | 9/2005 | Alexia et al. | 348/89 |
| 7,499,804 | B2 * | 3/2009 | Svendsen et al. | 701/301 |

(Continued)

FOREIGN PATENT DOCUMENTS

DE   102007008910   8/2008

(Continued)

OTHER PUBLICATIONS

EU Search Report and Opinion Application EP2165586, Jan. 4, 2010.

(Continued)

*Primary Examiner* — Michael Carone
*Assistant Examiner* — Samir Abdosh
(74) *Attorney, Agent, or Firm* — Patrick M. Sheldrake

(57) ABSTRACT

A system, and method of use thereof, that employs short distance communications signals, thereby limiting and localizing the dissemination area for such signals, for interactively coordinating crop material transfer operations between a harvester and a grain transport, including the automated conduct of an unloading operation, including commencement of the actual unloading of the grain through continuation of such unloading to termination of such unloading, which system and method of the present invention employs operating systems in the harvester and grain transport that so operate to become electronically linked to one another to thereafter operate in unison with one another to effect and control the conduct of the crop material transfer operation between the harvester and grain transport, with each of such operating systems having associated therewith a short range communications system for the transmission and receipt at close range of electronic data signals, such operating systems, when appropriately electronically linked to one another, being operable in conjunction with one another to exchange information, to maintain a communications link therebetween, and to automatedly coordinate and effect various activities of the harvester and grain transport as a crop material transfer operation is effected and proceeds.

25 Claims, 7 Drawing Sheets

U.S. PATENT DOCUMENTS

| | | | |
|---|---|---|---|
| 7,629,899 B2* | 12/2009 | Breed | 340/903 |
| 2002/0083695 A1* | 7/2002 | Behnke et al. | 56/119 |
| 2003/0191568 A1* | 10/2003 | Breed | 701/36 |
| 2005/0099265 A1* | 5/2005 | Dix et al. | 340/5.72 |
| 2005/0134440 A1* | 6/2005 | Breed | 340/435 |
| 2006/0014489 A1 | 1/2006 | Fitzner | |
| 2006/0047418 A1 | 3/2006 | Metzler et al. | 701/207 |
| 2006/0150584 A1 | 7/2006 | Weiss | |
| 2006/0217885 A1* | 9/2006 | Crady et al. | 701/213 |
| 2010/0030397 A1* | 2/2010 | Tachibana et al. | 701/1 |
| 2010/0063648 A1* | 3/2010 | Anderson | 701/1 |
| 2010/0063651 A1* | 3/2010 | Anderson | 701/2 |
| 2010/0063672 A1* | 3/2010 | Anderson | 701/34 |
| 2010/0094481 A1* | 4/2010 | Anderson | 701/1 |
| 2010/0228470 A1* | 9/2010 | Sakakibara | 701/200 |
| 2010/0274473 A1* | 10/2010 | Konishi | 701/200 |

FOREIGN PATENT DOCUMENTS

| | | |
|---|---|---|
| EP | 0070340 | 7/1981 |
| EP | 1574122 | 2/2005 |
| JP | 2242602 | 9/1990 |

OTHER PUBLICATIONS

Applicant Reply to communication from Examining Division EP2165586, Apr. 29, 2011.

* cited by examiner

SYSTEM AND METHOD EMPLOYING SHORT RANGE COMMUNICATIONS FOR INTERACTIVELY COORDINATING UNLOADING OPERATIONS BETWEEN A HARVESTER AND A GRAIN TRANSPORT

TECHNICAL FIELD

The present invention is directed to agricultural equipment, including combine harvesters and related crop transport equipment, and more particularly to a system, and method of use thereof, for interactively coordinating crop material transfer operations between a transferor-type vehicle and a transferee-type vehicle, such as unloading operations between a harvester and a grain transport. More specifically, the present invention is directed to a system and method of wirelessly intercommunicating at short distances, and utilizing short distance communication signals, on a point-to-point basis between a harvester and a grain transport, for coordinating the activities of the harvester and grain transport in a harvester unloading operation.

BACKGROUND ART

For many years, agricultural equipment, sometimes denoted herein by the abbreviation AE, and the individual agricultural machines of such agricultural equipment, have been operated under control of an operator thereof to perform various operations or actions, including, among other things, the harvesting of crops and the transport thereof. The performance by such agricultural equipment of the various actions has sometimes been based upon various data relating, among other things, to the individual machine being operated as well as to crop type, weather conditions, topographical conditions, and the position of the individual machine in the field from which the crop is being harvested or relative to other agricultural equipment. In addition, the status of such agricultural equipment or features or components thereof, such as, for example, the fill status of a grain bin of a combine harvester and the position of the combine harvester in a field being harvested, the load status of a crop transport and its position, especially relative to combine harvesters in a field, and the load status of a semi-trailer transporter and its location, particularly relative to the crop transports, has been considered pertinent information, which, when it can be properly shared amongst the relevant agricultural equipment, has been beneficial in the interplay and interaction of such relevant agricultural equipment as they perform a particular agricultural operation, such as the harvesting of a crop in a field and the transport of the harvested crop to storage.

In more recent years, sensors and processing devices and systems of various types have been employed to assist in the control and operation of the individual agricultural machines, and positioning systems of various designs have been developed to permit an accurate indication of the position of the individual machine within a field to be readily determined. Such sensors, processing devices, and systems have allowed equipment operators to be able to relatively quickly and easily determine the status of the equipment that they are operating at any given times, and to make use of that status information to coordinate activities with other agricultural equipment.

In part, to facilitate the coordination of activities between and among various individual pieces or machines of agricultural equipment, communications systems and devices of various types and constructions have been developed and installed on or in the individual agricultural machines so as to allow communications therebetween by the operators thereof and, in more recent years, even the communication or exchange of various data between two individual agricultural machines, typically by RF wireless communications.

In earlier systems, voice communications allowed the operator of a first individual agricultural machine to establish a communications link with and to orally communicate information, including machine location and operating information and status, to the operator of a second agricultural machine, including a different type of agricultural machine, thereby allowing the operator of the second agricultural machine to make adjustments in the operation of his or her individual machine as conditions might warrant. When the communications were between different types of agricultural machines, such as between a combine harvester and a crop transport vehicle, such communication was often intended to permit the navigation of the second agricultural machine to join or intercept the first agricultural machine, such as for the transfer of a harvested crop from the first to the second agricultural machine.

More recently, in some instances and with some communications systems, the machine operator of a combine harvester has been able to establish a communications link with and to provide data in an electronic form to a different operator or to the control system associated with the different agricultural machine, such as a crop transport vehicle, in order to permit coordination of crop transfer to the crop transport vehicle and, in some cases, to even remotely exercise some control over such crop transport vehicle, such as steerage of the crop transport vehicle to meet the combine harvester at the combine harvester's position in a field, and the scheduling of the time and location for the combine harvester and the crop transport vehicle to meet.

In other instances and with other systems, the machine operator of a crop transport vehicle has been able to receive on individual bases electronic data from one or more combine harvesters to permit the control system associated with the crop transport vehicle to coordinate the scheduling of positionings of the crop transport vehicle relative to the crop harvesters and the automated steerage of the crop transport vehicle to meet the combine harvesters at the combine harvesters' positions in a field so that coordinated transfers of the harvested crop from the combine harvesters to the crop transport vehicle can be effected.

For the most part, the electronic data so provided or received has related to the location and relative positionings of the combine harvesters and transport vehicles, with, in some instances, an operator of the combine harvester or the crop transport vehicle having the further ability to act as a master and to remotely control to some extent the navigation and/or steerage of others of the agricultural vehicles as slave vehicles in order to effect interceptions therebetween for the transfer of harvested crop from the combine harvesters to the transport vehicles.

In other instances, the electronic data has been communicated on individual bases by the individual agricultural machines to a control location distinct from both the combine harvesters and the transport vehicles, and remote operation of the combine harvesters and crop transport vehicles has been effected on individual bases from such distinct, and often significantly distanced, location.

In some situations, the control system of a slave vehicle has been so designed that, instead of, or in addition to, facilitating the steerage or navigation of the slave vehicle to effect an intercept with a master vehicle, the slave vehicle is controlled to follow, or to remain at a relatively fixed distance from, the master vehicle, based upon a continuing communication of the positioning and location information between or regarding the master and slave vehicles.

In such regards, many of the noted systems have utilized wireless RF broadcasts of the data of interest, which broadcast data has been utilized, upon receipt by another agricultural machine or a control location, for coordinating a meeting place for certain of the agricultural machines. In the real world, however, the unfettered broadcast, especially at RF frequencies and when over longer distances, of electronic data, and the actions by receptor agricultural equipment in responding to the receipt of such broadcast data and making use thereof, poses difficulties, especially when other, often similar agricultural equipment, perhaps engaged in harvesting a crop of a different type or under different ownership, is operating in adjacent or nearby fields or within the broadcast range of the electronic data that is so broadcast, is problemsome. If such other equipment is similarly broadcasting information pertinent to the particular operations that other equipment is engaged in, confusion, including as to which information is intended for which equipment groupings, may result.

The problem is exacerbated as more agricultural equipment and equipment groupings are within range of the RF broadcasts, especially if all such equipment of each of the equipment groupings is transmitting and receiving information, but with some portion of the information total intended for one agricultural grouping while other portions of the information total are intended for a second or third or fourth agricultural equipment grouping within the overlapping broadcast ranges of the individual agricultural machines. As will be appreciated, the wider the broadcast ranges of such systems and the greater the amount of information communicated thereover, the greater the probability of encountering problems.

Additionally, for the most part, even when such systems have been employed, the operator of the harvester has remained responsible for manually commencing the actual unloading operation once the harvester and transport are properly positioned for unloading and for then monitoring and manually controlling the unloading. In some instances, certain sensors and monitors of various types have been operable to detect conditions that might be considered problemsome for continued unloading and to provide indications to the operator so that appropriate actions could then be taken by such operator, such as a re-positioning of the discharge arm of the harvester or even discontinuation of the unloading operation. With certain systems, some minor adjustments to the positioning of the discharge arm, within certain limits, may even have been effectable without operator intervention, but, for the most part, close and continuing operator attention and intervention, especially in the event of undesirable conditions and to effect commencement and termination of unloading operations, has remained a necessity. Such necessity for close and continuing operator attention poses difficulties for an operator when unloading is occurring on-the-go since the operator may also be attempting to monitor and control other events at such time, including the continuing harvesting operation.

Consequently, users of agricultural equipment have continued to seek simple and reliable systems and methods for coordinating unloading operations between a harvester and a grain transport and for communicating and exchanging information therebetween during unloading operations, and for doing so in such a way and in such an environment that such coordinated actions require minimal operator attention and continuing involvement by such operator and do not result in a widespread broadcast or dissemination of information to other non-involved or extraneous agricultural equipment.

SUMMARY OF THE INVENTION

The present invention is thus directed to a system and method that employs short distance or short range communications signals, thereby limiting and localizing the dissemination area for such signals, for interactively coordinating crop material transfer operations between a pair of agricultural machines or vehicles, such as a grain unloading operation between a transferor-type vehicle, such as a harvester, and a transferee-type vehicle, such as a grain transport, including not just the relative positionings and steerage of such equipment but also the automated conduct of the unloading operation, including from commencement of the actual unloading of the grain through continuation of such unloading to termination of such unloading. The system and method of the present invention employs operating systems in the transferor-type vehicle and the transferee-type vehicle that so operate to become electronically linked to one another to thereafter operate in unison with one another to effect and control the conduct of a material transfer operation between the transferor-type vehicle and the transferee-type vehicle. Each of such operating systems includes or has associated therewith a short range communications system for the transmission and receipt at close range of electronic data signals, and such operating systems, when appropriately electronically linked to one another, are operable in conjunction with one another to exchange information, to maintain a communications link therebetween, and to automatedly coordinate and effect various activities of the transferor-type vehicle and the transferee-type vehicle as a crop material transfer operation is effected and proceeds.

In accordance with the present invention, each of such individual agricultural machines has an operating system that includes an operator interface portion, a sensor input portion, a master machine control, and an operation performance portion, with the master machine control operatively connected to such other noted portions. The operator interface portion includes operator input controls operable to provide operator input data to the master machine control. The sensor input portion is operable to monitor certain operational conditions, which preferably includes the GPS position of the machine, and to provide sensor input data to the master machine control. The output performance portion is operable to effect performance of certain actions by such individual agricultural machine under control of the master machine control thereof.

Each of the individual agricultural machines also has associated therewith a communications control portion operable to transmit and receive short distance communication signals, which communications control portion is operatively connected to the master machine control of the operating system to effect communication therefrom and thereto of communications data. Preferably, each agricultural machine, sometimes hereinafter referred to more simply as a vehicle, that has such a communications control portion may be controllably operated to enable such communications control portion to engage in short distance vehicle-to-vehicle communications, sometimes hereinafter referred to as V2V communications.

As will be explained in greater detail hereinafter, the system of the present invention is so designed that, when one or more harvesters and one or more grain transports are positioned to be within range of the short distance communications signals, and operated to enable V2V communications therebetween, a given harvester and a given grain transport from such positioned harvesters and grain transports can thereafter wirelessly communicate with one another to negotiate and establish a paired linkage for an unloading operation. With such a paired linkage, positioning and speed of the paired harvester and grain transport can then be controlled in a unified manner and, when an appropriate relative positioning of such equipment has been accomplished, when the harvester is ready for unloading, unloading can then be automatedly commenced when viable unloading conditions are detected and operations can be thereafter automatedly monitored to ensure that unloading conditions remain viable.

Inasmuch as the positions of the paired harvester and the paired grain transport relative to one another are important for unloading, to ensure that proper transfer from the harvester to the grain transport occurs with minimal spillage or waste, maintaining both effective and ongoing position determination and a stable communications link between the harvester and the grain transport during unloading operations is required. If either position determination or V2V communications are lost during an unloading operation, unloading will automatedly cease, either by a pause in the unloading operation until such problem is corrected or by a cancellation and termination of the unloading operation.

Operator override control permits operators of the equipment, especially the harvester, to assume manual control at any time and to take such actions as might be appropriate under then-existing circumstances.

Consequently, the system and method of the present invention permits a pair of agricultural machines to conveniently interactively wirelessly communicate with one another at close quarters and without widespread dissemination of the communications signals in order to coordinate a generally automated crop material transfer therebetween, with minimal operator attention or intervention required once V2V communications have been enabled between such equipment and the transferor equipment has communicated its readiness to proceed with an unloading operation.

Typically, the MMCs of each vehicle will include a microprocessor programmed to control the performance of and to effect various actions or activities by the respective vehicles, some of which may be dependent not only on the state of the vehicle of which it is a part, but also upon the state of a paired vehicle, and others of which may be executable without regard to the state of any paired vehicle, although the operating systems could also be hardwired or otherwise constructed to effect such actions or activities.

In general, the communications control portions of the operating systems of the individual agricultural machines will typically have a baseband control formed of or including firmware and may operate as a host controller for controlling the communication of data therefrom and thereto. The communications control portions are so designed that intercommunication between the individual agricultural machines can be effected in a manner that allows such machines to be designated or recognized as being entitled to participate in the exchange of data over the wireless communications link while restricting or inhibiting access to such data and intercommunication by other machines, such as agricultural machines in adjacent fields or third party systems. Such security can be achieved, at least in part, by the use of or adjustments in or to data protocols utilized, signal encryption, and/or restriction of the distribution range of the wireless signals.

Typically, including for purposes of additional security, the operator of a given agricultural machine will control the ability of his/her agricultural machine to engage in such short range V2V communications for coordinating crop material transfer, such as by enabling or disabling short range V2V communications by his/her agricultural machine. Depending upon the particular agricultural machine operating system utilized and the controls therefor, the operator may operate a switch or button associated with the operator input interface or may enter a command such as at a keyboard to enable or disable the short range V2V communications.

When a harvester whose short range V2V communications are enabled is within range of the short distance communications signals of a grain transport whose short range V2V communications are enabled, and such equipment present the proper credentials to one another for recognition as authorized machines, they will then be permitted to exchange information with one another over the wireless communications link therebetween. Other agricultural machines that may conceivably be within range of the short distance communications signals of such equipment, but which do not present the proper credentials, will not be recognized by such equipment and/or will not be entitled to exchange information.

An example of a system that employs short range communications for communicating and exchanging operational and logistical status information between and among a plurality of agricultural machines may be found in co-pending U.S. application Ser. No. 12/228,370, filed Aug. 12, 2008, which is incorporated herein by reference thereto.

As explained in such document, typical information that might be included within the operational and logistical status information made available over the short range wireless communications link would include vehicle identification and/or an operator designated label, vehicle brand and model of the vehicle, vehicle GPS co-ordinates, and operator identification, as well as such other vehicle status information as might be considered pertinent, in addition to action requests or acknowledgements or verifications or response signals produced or generated by a particular vehicle, such as upon or following the receipt of certain information by the vehicle. Inasmuch as many agricultural machines include as part of their sensor input portions information regarding the fill status or vehicle bin levels thereof, such fill information would also generally be included among the information exchanged, and, based upon such and other or additional sensor or other information, the master machine control (MMC) of a vehicle might also be operable to determine an estimate of the remaining time until a full condition would be reached.

Consequently, in accordance with the present invention, as part of the automated exchange of information, each of the agricultural machines may provide status and logistical information, including such information as current fill status and/or anticipated time to full, as well as equipment service requests, such as a request for unloading and/or for establishment of a paired linkage. Through the exchange of such status and logistical information, the operating systems of a particular harvester and a particular grain transport may, for example, negotiate and determine whether a paired linkage therebetween should be established for coordinating a crop material transfer from the harvester to the grain transport. Such determination will typically take into account various factors and considerations, such as the locations of such vehicles relative to one another and whether any other grain transport is closer to the harvester, as well as the fill status of the grain transport at such time, to name but a few.

If a paired linkage is determined to be appropriate, and once such paired linkage has been established, before commencement of the actual unloading operation, a unified control for the speed and positioning of the paired vehicles during the unloading operation must be established and the operating systems of both the harvester and the grain transport must be in ready states for unloading. The process for effecting such control unification and readiness may include the positioning of the harvester and grain transport relative to one another to be in close proximity to one another to achieve proper positioning thereof for an unloading operation, which positioning may be effected under manual and/or automatic control, and activation of controls or verification of conditions associated with both the harvester and the grain transport indicative of the readiness of each such vehicle to proceed with an unloading operation.

Typically, although not necessarily, recognition of the readiness of the harvester and the grain transport for unloading will be withheld until operation of an unload ready switch or button, or entry of an unload ready command, by the operator of the harvester after he/she has made a manual determination that the relative positioning of such vehicles appears proper. Depending upon the design and capabilities of the operating systems of such vehicles, additional status checks of various components and features, such as checks of sensor readings associated with the unloading arm and its position, may thereafter be made, such as when the discharge arm is extended and positioned for delivery of the grain from the harvester to the grain transport, before conditions necessary for the actual commencement of the unloading from the harvester to the grain transport are considered satisfied.

When all unload conditions have been met, when actual unloading commences or may then proceed, a latched unload condition is considered to have been established and to exist between the harvester and the grain transport, with the speed and positionings of the harvester and grain transport being maintained by a unified control. Typically, under the unified control, the grain transport will have turned over control of its speed and positioning to the harvester, although, under appropriate conditions and with appropriate hardware and software, the grain transport or a different vehicle or site could also be designated as the controller for a particular unloading operation.

In accordance with the present invention, once all necessary conditions for unloading have been confirmed to exist, the system will automatedly initiate the actual unloading of the grain from the harvester to the transport and will monitor various conditions as such unloading proceeds, including especially the relative positionings of the paired vehicles, the quality of the communications link between such paired vehicles, and the fill status of the harvester and the transport as well as any manual overrides.

Typically, the relative positionings of the paired vehicles may be determined in whole or in part from determined GPS positions, and any loss of GPS data would therefore be considered and treated as a loss of relative positioning information, although, in appropriate circumstances and with appropriate set-ups, other or alternate systems or manners of determining relative positionings could be employed as primary or backup systems for such positioning information.

Generally, loss of positioning information or the communications link between the paired vehicles will be considered fatal to continuation of the process resulting from the unload request and will result in at least the automated suspension, if not the cancellation and termination, of at least unified actions by the vehicles. If the loss of information, or the detection of certain out-of-limits conditions or the occurrence of certain failure conditions, is momentary or transient and acceptable conditions are quickly restored or easily restorable, the system of the present invention may, under appropriate circumstances, permit automated resumption, with minimal recycling, of the process resulting from the unload request, including the actual unloading operation, provided other requisite conditions otherwise remain viable, but if the loss is more extended or severe, or the result of, for example, an operator disabling V2V communications for his/her paired vehicle, automated termination of the process, including any unified actions, would generally be effected.

During an unloading operation the system of the present invention may be responsive to various operational and logistical status information being exchanged by the paired vehicles to automatedly effect certain adjustments relating to the unloading operation, such as, for example, adjusting the position of the discharge arm of the harvester or of a discharge knee and/or discharge flap associated with the discharge arm to better direct the flow of grain into the transport. Various sensors and operational elements may be utilized with the paired vehicles for such determinations and operations.

During unloading, if any condition required or considered desirable for continuation of the unloading operation changes to the extent that the latched unload condition is vitiated or continued unloading is deemed undesirable, an automated suspension or cancellation and termination of the unloading operation will be effected, depending upon the criticality of the condition change. If the condition can be relatively easily corrected, such as if the desirable relative positionings of the paired vehicles have deviated to the extent that there is a mispositioning that is easily correctable by the unified speed and positioning control to bring the relative positionings back within nominal values and tolerances, automated suspension of the unloading until viable conditions are again realized may be considered appropriate and be effected, but if the condition cannot be as easily corrected, such as because of an equipment failure, automated termination of the unloading will generally be effected.

Termination of the unloading operation may also result from other events. If, during unloading, it is detected that the grain holding bin of the harvester has been emptied, or if it is detected that the grain receptor bin of the transport has become full, either of which events would be considered a normal completion of an unloading operation, the system will operate to effect the automated termination of the unloading operation. Termination of unloading may also result from actions of vehicle operators that specifically cancel and terminate the unloading, such as entry of a cancellation command, from actions, usually by vehicle operators, whose effect is to cause a condition required for continuation of the unloading operation to deviate from a required status or value, or from conditions or events that occur during the course of the unloading operation and cause a condition required for continuation of the unloading operation to deviate from a required status or value.

Typically, once an unloading operation has been terminated, it will be necessary to again negotiate and establish a paired linkage to effect a new unloading operation.

With the system and method of the present invention, a transferor-type vehicle and a transferee-type vehicle can thus effectively and advantageously communicate with one another at close range by employing short range communication signals to exchange information, to establish a paired linkage therebetween, and to interactively coordinate a crop material transfer operation therebetween, without a wide dissemination of the information being exchanged and with minimal need for intervention by vehicle operators during the actual crop material transfer. Because of the limited range of the communications signals, many of the problems that would otherwise result from information broadcasts over longer ranges and with unfettered access thereto can be lessened or minimized. The generally automated operation of the linked operating systems of the transferor-type vehicle and the transferee-type vehicle minimizes the need for vehicle operator intervention during crop material transfer operations and frees such operators, especially during on-the-go crop material transfer operations, to concentrate on other matters, such as continuing harvesting operations.

BRIEF DESCRIPTION OF THE DRAWINGS

FIG. 2 is a block diagram of various components associated with an operating system of a piece of agricultural equipment or the like.

DETAILED DESCRIPTION OF THE INVENTION

Figure 1:
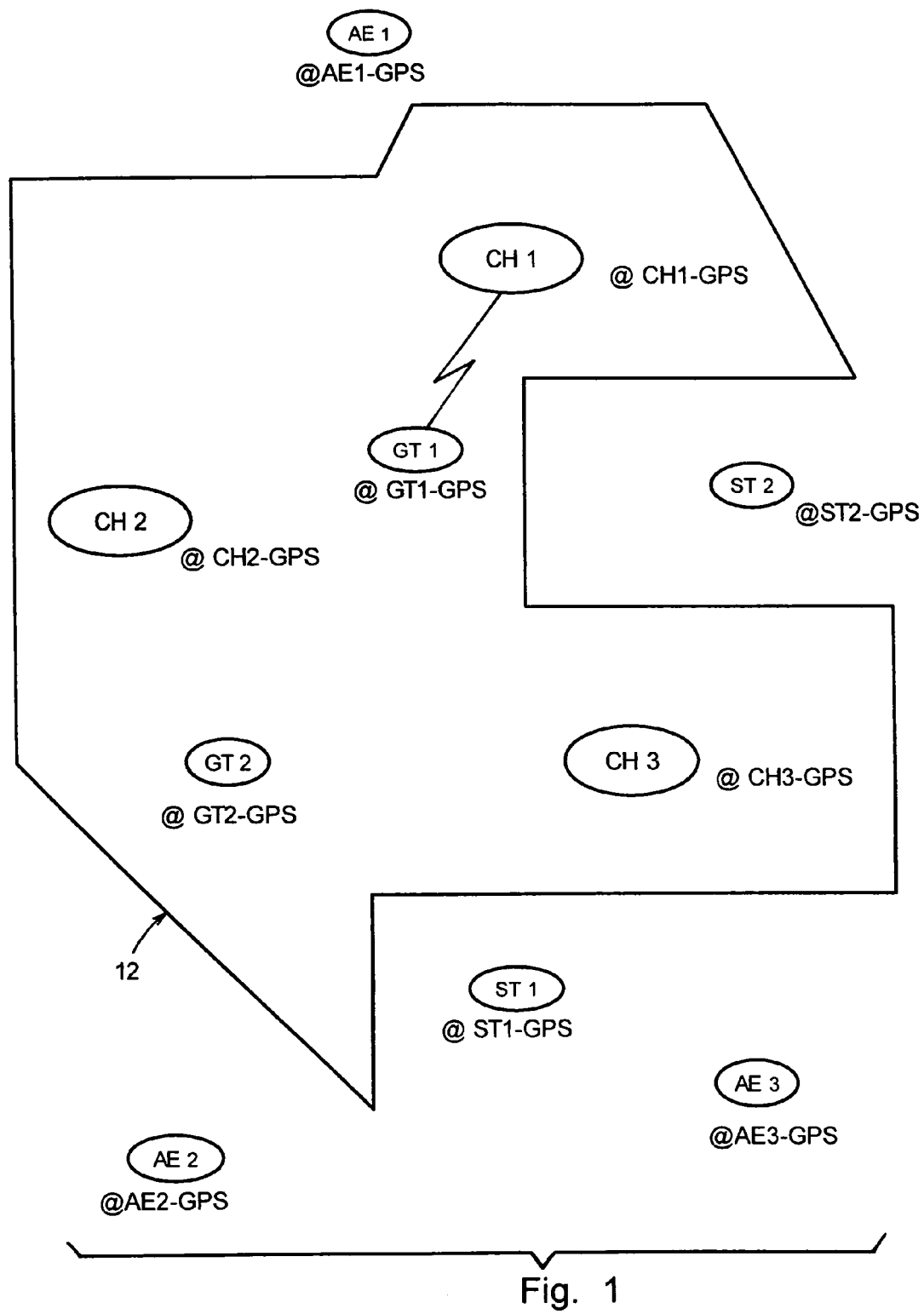
FIG. 1 is a diagram depicting a representative field in which or about which several combine harvesters, tractors with grain transports, and semi-trailer transporters are disposed, as well as other extraneous agricultural equipment.

Referring now to the drawings, wherein like numbers refer to like items, FIG. 1 depicts a field 12 with a plurality of agricultural vehicles of various types therein and therearound, including combine harvesters CH1, CH2, and CH3, tractors with grain transports GT1 and GT2, and semi-trailer transporters ST1 and ST2, all of which machines are engaged in the harvesting of the particular crop in field 12, including the transport of such crop to storage. For convenience in future reference herein, the combine harvesters may often hereinafter be referred to more simply as harvesters, the tractors with grain transports may often hereinafter be referred to more simply as grain transports or transports, and the semi-trailer transporters may often hereinafter be referred to more simply as transporters.

As depicted in FIG. 1, combine harvester CH1 is at location CH1-GPS, combine harvester CH2 is at location CH2-GPS, and combine harvester CH3 is at location CH3-GPS. Similarly, grain transports GT1 and GT2 are at locations GT1-GPS and GT2-GPS, respectively, and transporters ST1 and ST2 are at locations ST1-GPS and ST2-GPS, respectively.

Additional agricultural equipment AE1, AE2, and AE3 is also shown, which agricultural equipment is not engaged in the harvesting of the particular crop in field 12. Such agricultural machines AE1, AE2, and AE3 are at locations AE1-GPS, AE2-GPS, and AE3-GPS, respectively.

Figure 2:
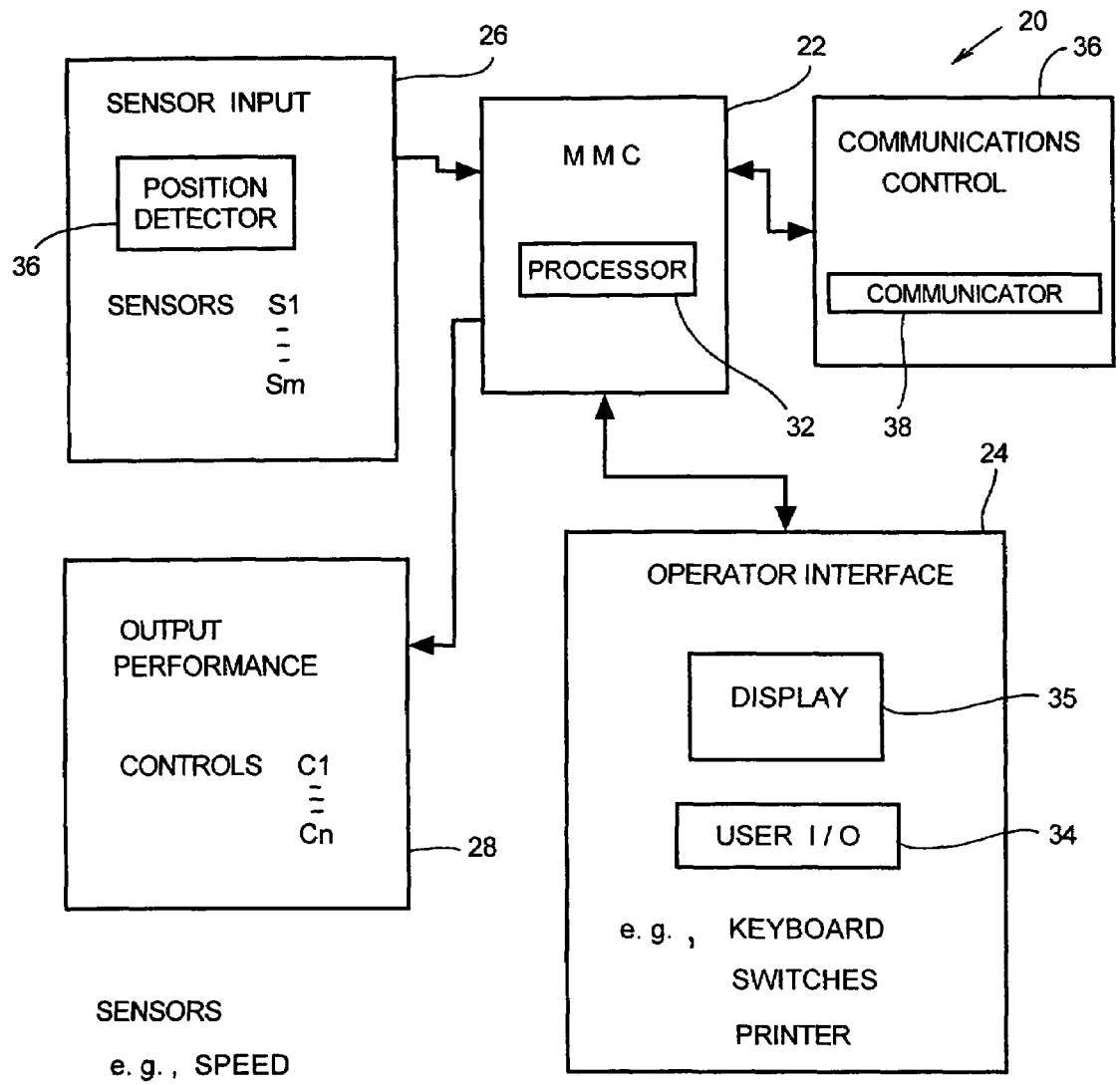

Each of such agricultural machines CH1 through CH3, GT1 and GT2, and ST1 and ST2 includes an operating system 20 such as depicted in FIG. 2, which operating system 20 includes a master machine control (MMC) 22, an operator interface portion 24, a sensor input portion 26, and an output performance portion 28. The MMC 22 typically includes a processor portion 32, often operating under program control, variously sometimes referred to as operating system software or master machine control software or the operating software or program, that is operatively connected to the other noted portions of the operating system 20.

Operator interface portion 24 typically includes a user input/output (I/O) interface 34 that may include, by way of example and not of limitation, a keyboard for the entry of commands or other input, control switches, and printout devices, as well as a display portion 35 that may include, by way of example and not of limitation, a video display, lights, and gauges. A touch screen display, which includes features for both input and output of information, may also be advantageously employed as part of the operator interface portion 24.

Sensor input portion 26 typically includes a plurality of sensors S1 through Sm connected to monitor various conditions of the agricultural machine and of the environment in which the agricultural machine is operating. Such sensor input portion 26 also includes or has associated therewith a position sensing or determination system 36, including known systems for determining the location of the agricultural machine by global positioning, which system 36 may hereinafter sometimes be referred to as a position detector system.

The output performance portion 28 includes various operation controls C1 through Cn for controlling various operations or actions of the agricultural equipment. For a harvester, such controls C1 through Cn may, for example, include equipment and controls for setting or adjusting the harvester's speed, steerage, height of cutting or harvesting implements, distribution of crop residue, and positioning in the field, among numerous other possible actions, such as positioning of the harvester unloading device, including, by way of example, the unload or discharge tube of a combine harvester, and operation of grain transfer apparatus to effect the discharge of grain from a holding bin through the discharge tube. For other agricultural equipment, such as grain transports and transporters, such controls may include various other controls. Typically, most, if not all, of such agricultural equipment will include at least speed and steerage controls, and many may also have controls for determining or updating the GPS position of the equipment and effecting communications with other equipment, including long distance communications, as will be further addressed hereinafter. Except to the extent otherwise addressed hereinafter, and for the most part, such controls, equipment, and apparatus, and the operation thereof, is well known and the particular features and configurations thereof are not critical to the present invention or its practice.

With such an operating system 20, MMC 22 is operable, based at least in part upon data and information received from the operator interface portion 24 and the sensor input portion 26, to control the operation of the agricultural machine through output performance portion 28. Control of output performance portion 28 and of the individual controls C1 through Cn thereof is effected by the establishment by processor portion 32 of various performance parameters and the use of such performance parameters in controlling the individual controls C1 through Cn.

When the performance parameters are established based primarily, if not exclusively, upon data made available through the operator interface portion 24 and the sensor input portion 26, the performance parameters are typically considered to be machine-specific performance parameters. Certain of the machine-specific parameters may change or be modified based upon inputs received from sensors S1 through Sm as the harvesting operation proceeds, while other performance parameters may remain set and unchanged.

Additionally, in accordance with the present invention, operating system 20 also includes a communications control portion 36, operatively connected to MMC 22, that serves as a gateway for the communication of data and information between MMC 22 and external sources. As will be addressed in greater detail hereinafter, such communications control portion 36 allows a user to control the wireless transmission of data and information to or the receipt of data and information from external sources, which data and information can be utilized by the equipment operator or the equipment itself to determine further actions. In some instances, MMC 22 may be responsive to receipt of data and information, especially if such data or information is provided in response to a request for such data or information submitted to the external source, to display or output the received data or information, such as by user I/O 34. In other instances, when MMC 22 is properly configured or programmed, MMC 22 may operate in response to such received data or information to effect certain actions by output performance portion 28 or changes in certain performance parameters, as a consequence of which some of the performance parameters might no longer be considered machine-specific.

As will be discussed in greater detail hereinafter, for purposes of the present invention, communications control portion 36 is specifically designed to be capable of transmitting and receiving short distance communications signals, such as, but not necessarily limited to, microwave signals associated with frequencies that often, if not typically, are in the low gigahertz range, including, by way of example and not of limitation, frequencies in the L, S, C, and X bands. The communications control portion 36 may also be capable of transmitting and receiving longer distance communications signals, including RF signals, such as might be required for GPS position determinations or for communications over RF links, but such communications control portion 36 need not necessarily be operable in such a longer distance mode for purposes of the present invention. Desirably, communications control portion 36 and MMC 22 are so constructed and configured that the short distance wireless signals transmitted by communications control portion 36 can be shared on a point-to-point basis with other recognized or authorized equipment.

Figure 3:
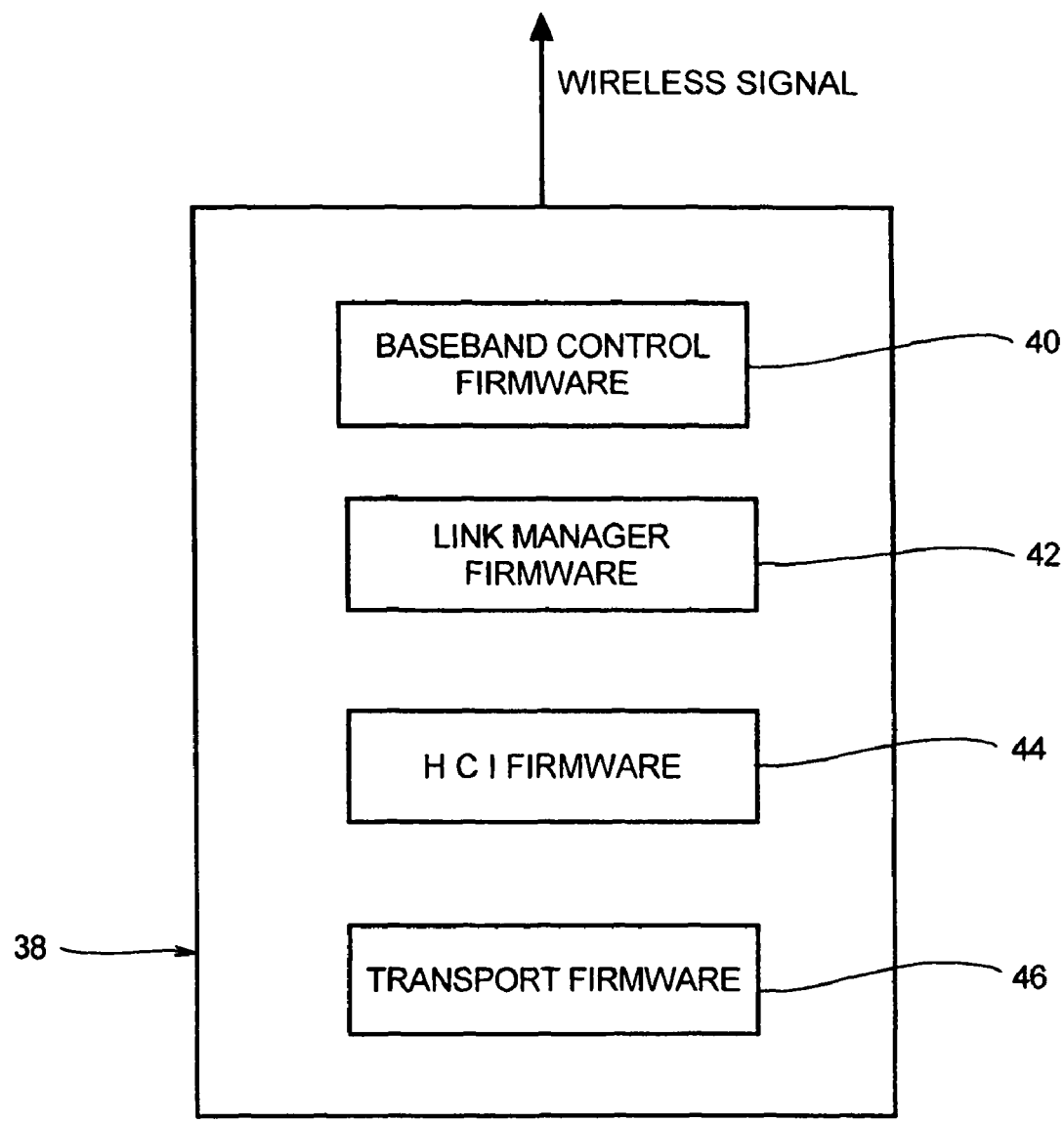
FIG. 3 is a block diagram of a typical communicator module included in the communications control portion of the operating system of an agricultural machine configured in accordance with the present invention.

FIG. 3 depicts in schematic or block form a module 38 such as may form or be included within the communications control portion 36. As presented in FIG. 3, module 38, which is hereinafter often referred to as a communicator module, is shown to include a baseband control portion 40, a link manager portion 42, a host controller interface (HCI) portion 44, and a transport portion 46. Typically, such portions include program code installed to permanently reside or be retained within or associated with hardware components, such as to be in read only memory, which program code thus is often considered to constitute firmware, but that need not necessarily be the case. Depending upon the desires of manufacturers and users, such portions may be designed and configured to include hardwired or specialty hardware components, to include hardware with installed firmware, or to include hardware with associated software, all of which configurations may be utilized to the same effect.

In accordance with the present invention, a module such as module 38 is associated with the communications control portion 36 of each of the agricultural machines CH1 through CH3, GT1 through GT2, and ST1 through ST2. Such module 38 is generally operable to transmit and receive short distance communications signals, including, but not limited to, signals made available through WiFi, Bluetooth, and ZigBee systems, and/or through the use of dedicated short range communication (DSRC), in accordance with the construction details of such module as well as certain protocols and standards, which may be determined by or included within component hardware, firmware, and software, and is preferably configured to provide or employ security features therewith, including forms of signal encryption in various instances, to permit recognized or authorized agricultural machines to communicate with one another while preventing unauthorized agricultural machines from being able to so communicate.

Figure 4:
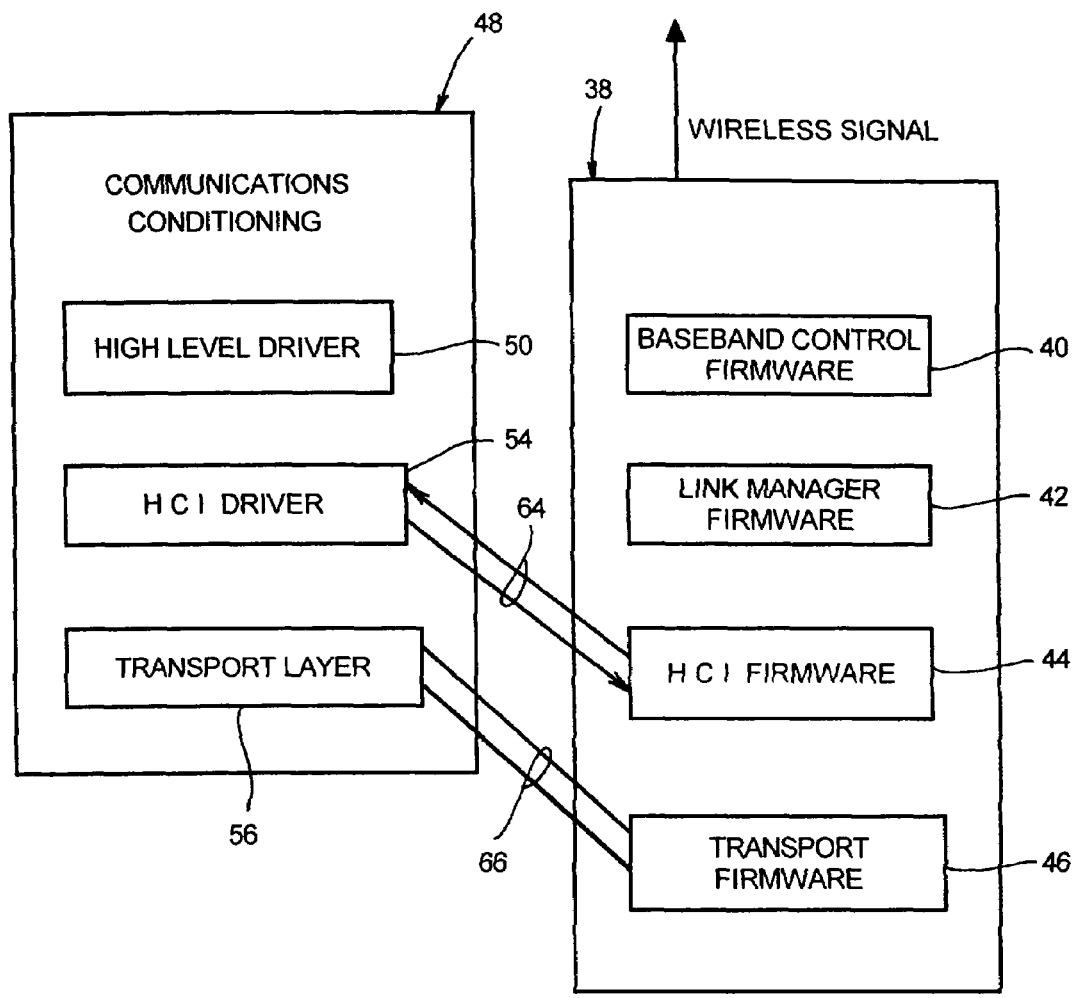
FIG. 4 is a block diagram illustrating the relationship of the communicator module of the communications control portion of FIG. 3 with a communications conditioning module of the master machine control of the operating system.

Typically, each of the agricultural machines of interest relative to the present invention will also include as part of MMC 22 an associated module 48, as generally depicted in FIG. 4, hereinafter referred to as a communications conditioning module, that functions with communicator module 38 to control the transmission and receipt of data signals by operating system 20. In such regard, as depicted generally in FIG. 4, communications conditioning module 48 of MMC 22 may be considered to include a high level driver portion 50, a host controller interface (HCI) driver portion 54, and a transport layer portion 56. When the communicator module 38 and the communications conditioning module 48 are considered to have such general configurations, data and control interchanges may typically be considered to occur between the HCI driver portion 54 of communications conditioning module 48 and the HCI firmware section 44 of communicator module 38 and between the transport layer portion 56 of communications conditioning module 48 and the transport firmware section 46 of communicator module 38, as denoted by the interchange pairings 64 and 66. Typically, high level driver portion 50 will serve or function as a link or interface between master machine control software such as may be employed with the processor 32 and the more particularized software and firmware employed with the host controller interface driver portions and transport layer portions 54 and 56.

As will be appreciated by those skilled in the art, the communicator and communications conditioning modules 38 and 48 may take many forms and employ firmware and software designed or adapted to operate in conformity with the particular agricultural equipment (AE) with which they are employed and with the operating system software utilized in such agricultural equipment. Depending upon the particular forms of such modules 38 and 48 and the operating systems of the agricultural equipment of which they form a part, greater or lesser functional responsibilities may be distributed between the modules 38 and 48 and their component sections and portions, to the point that, in some instances, most of the firmware and software associated with the wireless communications may be subsumed within operating system hardware and software for the agricultural equipment, principally identified as being included within MMC 22, particularly where the agricultural equipment is provided by a manufacturer with an operating system that integrates to a great degree the hardware and software for the operation of such system, similar to the manner in which many personal computer systems may be provided with modem support integrated onto a motherboard and with related drivers and software included with the operating system software.

To greater or lesser degrees, the various other elements depicted in FIG. 2, may also be subsumed into such operating system hardware and software, and in some instances, position detection, including determination of a GPS position, may involve elements or portions of all of position detector 36 of sensor input portion 26, communications control portion 36, and MMC 22, especially when position detection makes use of global positioning signals.

In any event, the communications control portion 36 of operating system 20 is considered to be operable under control of MMC 22 to control the wireless signals transmitted and received by the agricultural equipment of which it forms a part. With particular regard to the present invention, MMC 22 and communications control portion 36 of operating system 20 of a particular harvester, such as harvester CH1, are designed and configured and operate to be able to operatively identify various other vehicles with which communications links may be established and to operatively connect to such other vehicles on a point-to-point basis. The MMCs 22 and communications control portions 36 of harvesters CH2 and CH3, grain transports GT1 and GT2, and transporters ST1 and ST2 are similarly operable to establish such point-to-point connectivity with other vehicles. Identification of the agricultural machines to one another may utilize various name resolution and graphing and security technologies in order to ensure that only authorized agricultural machines will be able to be recognized in establishing a point-to-point paired communications link between any two agricultural machines and that other agricultural equipment, such as agricultural machines AE1, AE2, and AE3, will be excluded from participation.

In general, each agricultural machine entitled to be recognized or to participate in the system of the present invention, may be required to have an identity and credentials that prove the ownership of such participant's identity. Oftentimes, a qualified participant may be referred to as a group or pair member and will have credentials to prove that it may be recognized as a member of a particular group or pair.

In FIG. 1, extraneous agricultural equipment, such as AE1, AE2, and AE3 in such FIG. 1, are not considered to be able to communicate over a communications link such as has been discussed, either because they do not have the appropriate authentication credentials to entitle them to recognition or because they are beyond the range of the short distance communications signals of a group or pair member.

When a plurality of agricultural machines are positioned in a field, such as at positions as shown in FIG. 1, the operators of such agricultural machines may initiate actions to enable their individual vehicles to engage in vehicle to vehicle communications, hereinafter often referred to V2V communications, with other vehicles that are within range of the short distance communications signals. If two such vehicles, such as CH1 and GT1, with appropriate authentication credentials, are so enabled, point-to-point exchanges of data can then transpire therebetween, as is indicated by point-to-point communications link depicted extending between harvester CH1 and grain transport GT1 in FIG. 1, and a communications link pairing can be negotiated and established therebetween, typically in response to actions by the operator of harvester CH1 indicating a desire for an unloading operation.

Figure 5:
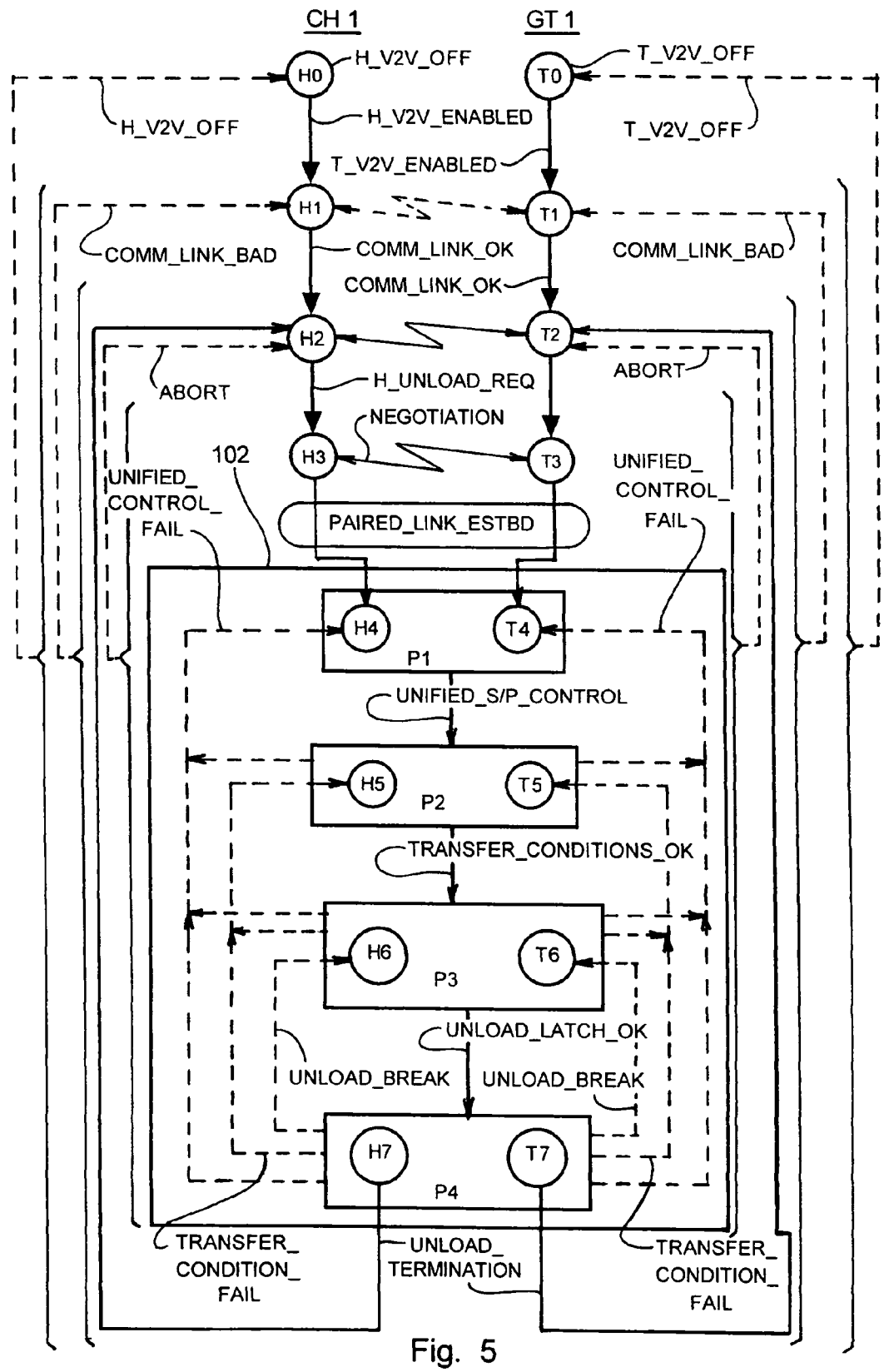
FIG. 5 is a form of state-flow diagram generally illustrating the operation of a representative system according to the present invention.

FIG. 5 depicts a generalized and simplified form of a state-flow diagram for one representative embodiment of a system according to the present invention, wherein various states of the harvester CH1 are presented as states H0 through H7, various states of the grain transport are presented as states T0 through T7, and various paired states are presented as states P1 through P4. It should be appreciated that, although various of the states are, for convenience of discussion, depicted as differentiable states, such as states T2 and T3, the operational status of the states may be the same or essentially the same, especially if the noted action in moving from one state to the next state, such as from state T2 to state T3, is associated with an action or event associated with the other vehicle, with the distinction between such states perhaps being the recognition of such action or event as information is exchanged between the vehicles.

In general, series of corresponding states are set forth for harvester CH1 and grain transport GT1, with states H0 through H7 being associated with harvester CH1 and states T0 though T7 being associated with grain transport GT1, as such vehicles operate to interactively communicate with one another to coordinate and effect unloading of grain from harvester CH1 to grain transport GT1.

When harvester CH1 and grain transport GT1 are in their respective states H0 and T0, such vehicles are operating independently of and without regard to one another, with V2V communications disabled, as indicated by the legends H_V2V_OFF and T_V2V_OFF. Harvester CH1 will proceed to state H1 if and when V2V communications therefor are enabled, signified by the legend H_V2V_ENABLED, and grain transport GT1 will independently proceed to state T1 if and when V2V communications therefor are enabled, signified by the legend T_V2V_ENABLED. Such enablings of V2V communications typically need not and will not typically occur at or near the same times, as a consequence of which states H1 and T1 will typically be entered into at differing times.

When harvester CH1 is at state H1 and grain transport is at state T1, short range communications therebetween may ensue, as represented by the dashed communication link lead between states H1 and T1. When harvester CH1 recognizes communications with grain transport GT1, as signified by the legend COMM_LINK_OK associated with the lead between states H1 and H2, it may then proceed to state H2, and when grain transport GT1 recognizes communications with harvester CH1, as likewise signified by the legend COMM_LINK_OK associated with the lead between states T1 and T2, it may then proceed to state T2. Such recognitions need not necessarily occur at the same time. The solid communication link lead between states H2 and T2 is intended to signify the existence of a good communications link between harvester CH1 and grain transport GT1. In such states H2 and T2, harvester CH1 and grain transport GT1 are typically still engaged in independent operation, but may be exchanging information with one another via short range communications signals.

With reference to FIG. 1, it should be appreciated and understood that a similar communications link, not shown in FIG. 5, could likewise be established between harvester CH1 and grain transport GT2 if harvester CH1 and grain transport GT2 are within range of the short distance communications. In such event, based upon the exchange of logistical data by harvester CH1 and grain transports GT1 and GT2, positionings of such vehicles relative to one another can be determined. With the vehicles positioned as depicted in FIG. 1, it can thus be determined that grain transport GT1 is nearer to harvester CH1 than is grain transport GT2.

If, in the exchange of information while harvester CH1 is in state H2 and grain transports GT1 and GT2 are in states T2, harvester CH1 submits an unload request, harvester CH1 will proceed to state H3 and grain transports GT1 and/or GT2, upon recognition of such unload request, will proceed to states T3, in which states negotiations may then ensue between harvester CH1 and such grain transports GT1 and/or GT2 to determine whether a paired linkage should be established between harvester CH1 and either of such grain transports. Such negotiation, which is represented by the legend NEGOTIATION associated with the communications link lead between states H3 and T3, may include, among other things, indications of the fill status of such vehicles, a determination of the locations of such vehicles relative to one another at that time, and a determination of which grain transport with which harvester CH1 has a good communications link may be closer to harvester CH1 or more capable of accepting a grain transfer, such as because it has more capacity remaining available.

If it is determined that a paired linkage between harvester CH1 and grain transport GT1 should be established, as signified by the legend PAIRED_LINK_ESTBD associated with the leads between states H3 and H4 and states T3 and T4, harvester CH1 and grain transport GT1 will proceed to paired state P1 with harvester CH1 at state H4 and grain transport GT1 at state T4.

Typically, a harvester will enter into a paired relationship with only one grain transport at a time. It is envisioned, however, that, with more advanced systems, it would be possible for a harvester to enter into multiple paired relationships in which the paired relationships are prioritized and/or coordinated such that actions might be so scheduled that a second grain transport would follow and replace a first grain transport when the first grain transport becomes filled.

In the more simplified situation in which a paired relationship is established between only a single harvester and a single grain transport as depicted in FIG. 5, harvester CH1 and grain transport GT1 are considered to be in a paired relationship while in paired states P1 through P4, as represented by the inclusion of such states within the box outline 102 that encompasses such states as well as the included harvester states H4 through H7 and grain transport states T4 through T7. Generally the entry of harvester CH1 to state H4 and the entry of grain transport GT1 to state T4 will occur at about the same time, when establishment of the paired linkage is agreed upon, with the result that the system of the present invention will then be in paired state P1.

Once a paired relationship has been established between a transferor-type vehicle, such as harvester CH1, and a transferee-type vehicle, such as grain transport GT1, as signified by paired state P1 in FIG. 5, steps must still be taken to ensure the existence of appropriate conditions for the commencement of a unloading operation. As has previously been discussed, in order for unloading to proceed, harvester CH1 and grain transport GT1 must be properly positioned relative to one another. Accordingly, for harvester CH1 and grain transport GT1 to proceed from their respective states H4 and T4 of paired state P1 to states H5 and T5 in paired state P2, agreement must be reached as to a unified speed and position control of such harvester CH1 and grain transport GT1. Typically, speed and positioning control of grain transport GT1 will be turned over to harvester CH1, although, as previously noted, other scenarios might also be employed.

Figure 6:
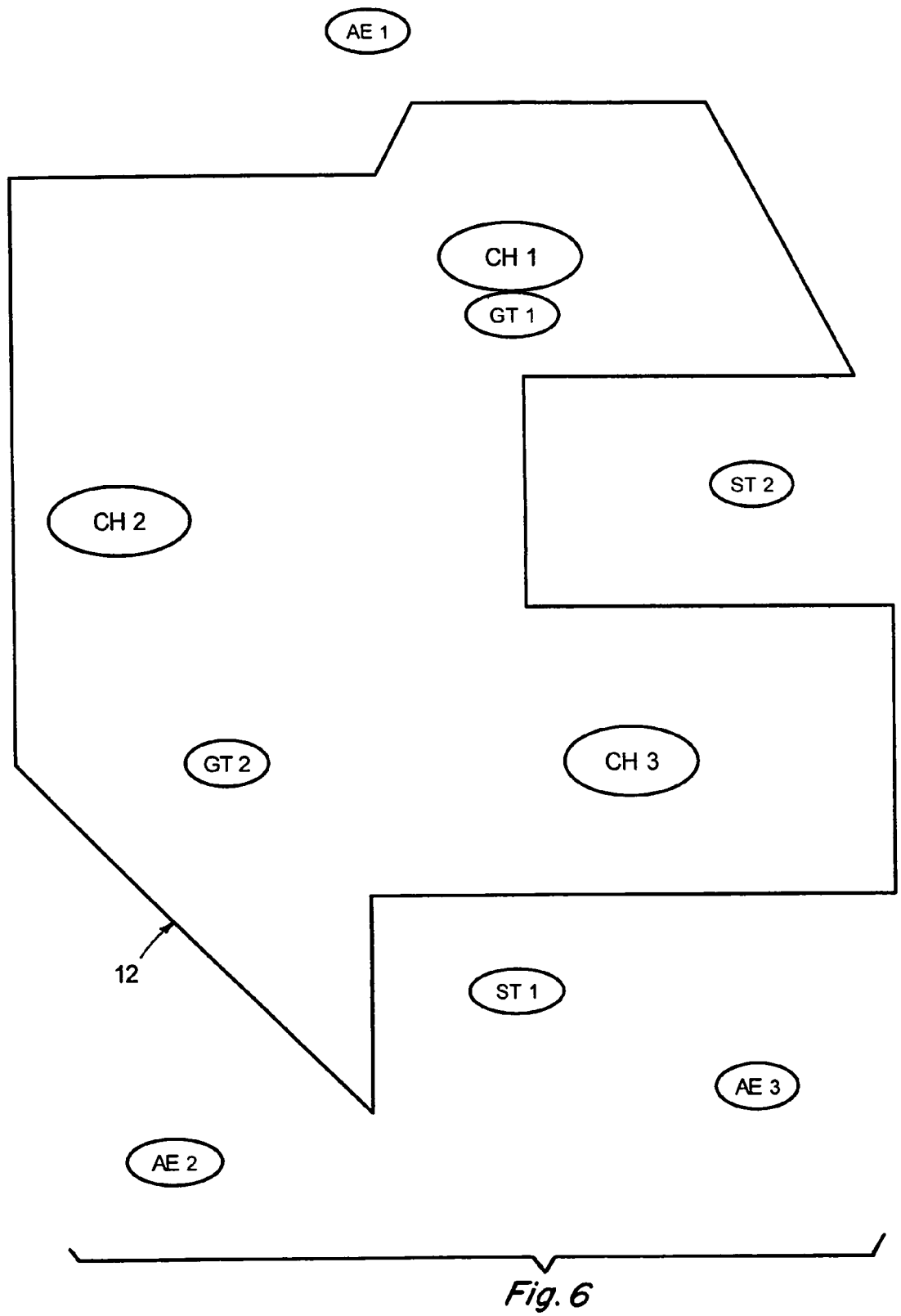
FIG. 6 is a diagram similar to FIG. 1, but showing various of the agricultural equipment as located at a subsequent time when grain transport GT1 has moved into close proximity to harvester CH1 for the purpose of effecting an unloading of grain from harvester CH1 to grain transport GT1.
Figure 7:
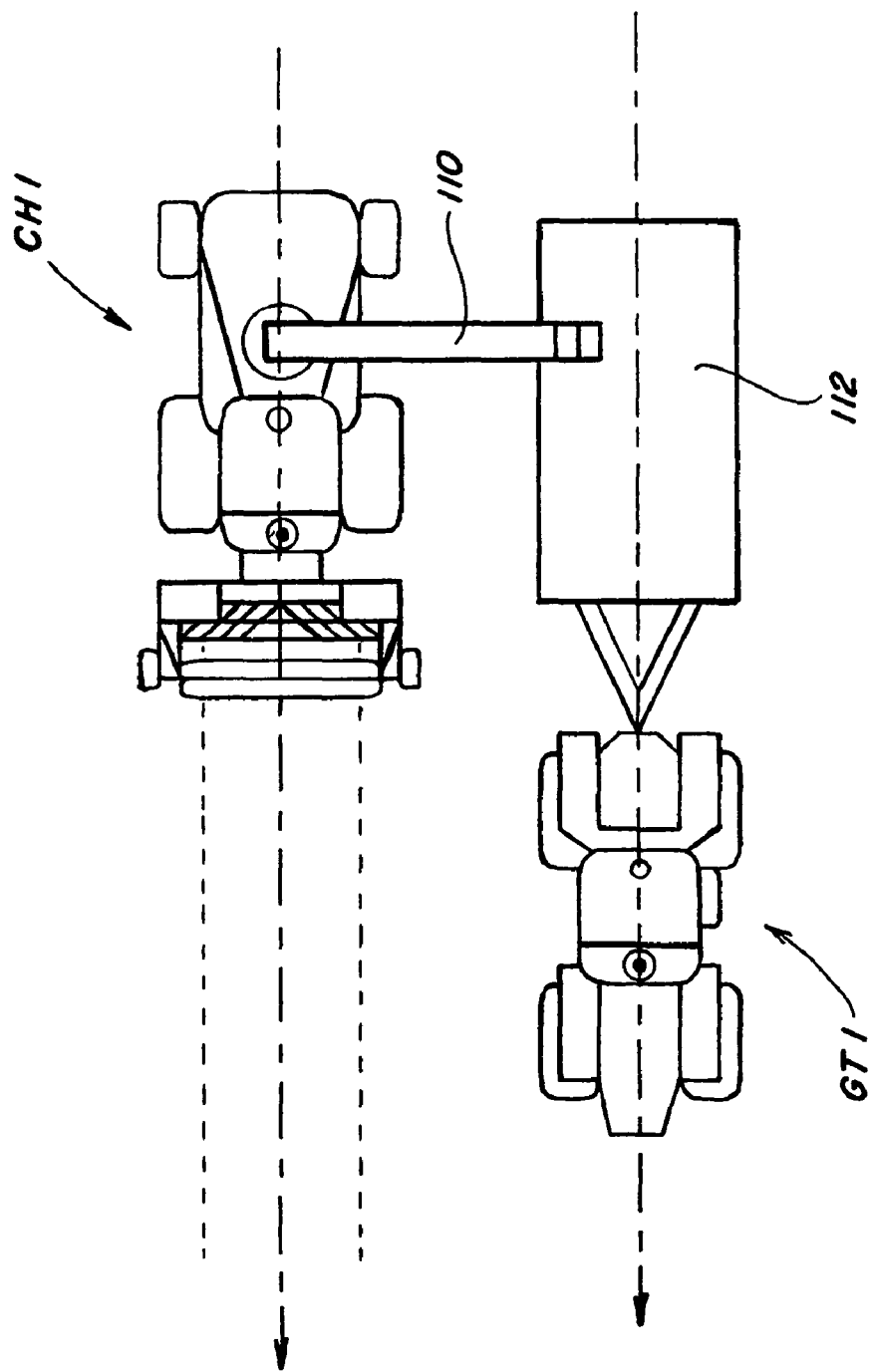
FIG. 7 is a generalized top plan view of the harvester CH1 and the grain transport GT1 of FIG. 6 depicting the harvester and grain transport in somewhat greater detail and in close proximity to one another positioned for grain unloading from the harvester to the grain transport.

When such agreement is reached, as signified in FIG. 5 by the legend UNIFIED_S/P_CONTROL associated with the lead between paired states P1 and P2, which agreement may be conditioned upon actuation or operation of various operator controls of the grain transport GT1 and/or harvester CH1, the paired vehicles may proceed to paired state P2, in which paired state various checks may be made by the harvester CH1 and by grain transport GT1 in their respective states H5 and T5 to verify and confirm that viable conditions have been established to permit unloading to commence and proceed. While in such states H5 and T5 certain operations may be performed independently by the vehicles and other operations may be performed by the vehicles in conjunction with one another to effect desired results. In such regard, the vehicles may operate to position grain transport GT1 in a proper position relative to harvester CH1, as depicted in FIGS. 6 and 7, to permit unloading, and harvester CH1 may then extend and position its discharge chute 110 (FIG. 7) to direct flow of crop material therethrough to be discharged towards the grain material receptor bin 112 of grain transport GT1. Various sensors and monitors may be checked or queried to confirm proper alignments and the existence of conditions that are deemed appropriate to allow unloading to occur.

Depending upon the particular designs of various systems, positive actions by the operators of the grain transport GT1 and/or the harvester CH1 may, but need not necessarily, be required to establish or confirm the viability of transfer conditions necessary before commencement of unloading actions. For example, actuation of a switch or entry of a command by the operator of the grain transport GT1, acknowledging the readiness, or at least the consent, of the operator of such vehicle to further progression towards harvester unloading, might be required as a condition for proceeding. Similarly, actuation of a switch or entry of a command by the operator of the harvester CH1, acknowledging the readiness, or at least the consent, of the operator of such vehicle to further progression towards harvester unloading, might also or alternatively be required as a condition for proceeding.

When all conditions considered necessary for commencement of an unloading operation are deemed viable or to have been satisfied in paired state P2, as signified by the legend TRANSFER_CONDITION_OK associated with the lead between paired states P2 and P3, the paired vehicles may proceed to paired state P3 wherein final adjustments and settings of controls for the commencement of loading may be effected, notifications may be provided that unloading is commencing, and actual unloading may be commenced. If desired, positive acknowledgements from operators of the paired vehicles may, but need not necessarily, be solicited prior to the actual commencement of the unloading under system control.

Upon the commencement of actual unloading, as denoted by the legend UNLOAD_LATCH_OK associated with the lead link between paired states P3 and P4, signifying the existence of a latched unloading operation, harvester CH1 proceeds to state H7 and grain transport GT1 proceeds to state T7. In paired state P4, unloading then proceeds until or unless such unloading is terminated, such as by completion of the unloading operation, or is otherwise interrupted for some reason. During the course of such unloading, harvester CH1 and grain transport GT1 will typically be continuously monitoring various conditions and sensors, including sensors associated with the grain holding bin of harvester CH1 and the grain receptor bin of grain transport GT1, and exchanging logistical data set information, to verify that unloading is occurring as desired.

As unloading proceeds, depending upon detected conditions, various adjustments relating to the relative positionings of the vehicles and the configuration of the discharge chute 112 may be effected, and various other actions may also be taken, to maintain the paired vehicles in optimized configurations for the ongoing grain unloading. Depending upon the designs of various systems, at least some of such adjustments and actions will typically be automatedly performed under system control while other adjustments and actions may permissibly be controlled or effected by the vehicle operators.

Normal completion of an unloading operation is typically considered to have been accomplished when either the grain holding bin of harvester CH1 is sensed to be empty or the grain receptor bin of grain transport GT1 is sensed to be full. Upon such occurrences, notifications of such unloading completion will typically be provided to the operators of the vehicles so that appropriate actions can be taken thereby. Depending upon the particular designs of various systems, the discharge chute 112 may be repositioned by harvester CH1 and actions to disengage the unified speed and position control may be effected. Such actions might, but need not necessarily, include the automated steerage and movement of the grain transport to distance the grain transport GT1 from the harvester CH1 by some degree to avoid possible entanglement or collision between such vehicles as independent control of such vehicles is effected. In such regard, positive actions by the vehicle operators may, but need not necessarily, be solicited prior to the return of individual control to such operators or their vehicles.

Following the completion of an unloading operation and such other actions as may be deemed appropriate or desirable before disengagement of the pairing between harvester CH1 and grain transport GT1, the paired relationship between harvester CH1 and grain transport GT1 will be terminated, with harvester CH1 proceeding from state H7 back to state H2 and grain transport GT1 proceeding from state T7 back to state T2, at least so long as the V2V communications remain enabled and the communications link between such vehicles remains good, with such termination represented by the legends UNLOAD_TERMINATION associated with the lead links between states H7 and H2 and T7 and T2.

It will be appreciated that, during the course of an unloading operation, circumstances may arise as a consequence of which it may be advisable or desirable to interrupt or terminate the unloading operation. Under one set of circumstances, as represented by the legend UNLOAD_BREAK associated with the dotted lead links between paired states P4 and P3, harvester CH1 will proceed from state H7 to state H6 and grain transport GT1 will proceed from state T7 to state T6. Such circumstances might, for example, arise if the operator of harvester CH1 activated a control or entered a command requesting a temporary cessation of unloading, such as while he addresses some issue associated with his vehicle that will not result in a loss of unified speed and positioning control or out of limits or failure conditions for the requisite transfer conditions. Such circumstances might also arise in the event of, or during the performance of, an automated adjustment. Once UNLOAD_LATCH_OK can be reestablished, the paired vehicles can again progress from paired state P3 to state P4 and unloading can continue.

A more severe interruption might arise if a requisite transfer condition that is being monitored goes out of limits or otherwise fails. In such event, as represented by the legend TRANSFER_CONDITION_FAIL associated with the dotted lead links between paired state P4 and paired state P2, harvester CH1 will proceed from state H7 to state H5 and grain transport GT1 will proceed from state T7 to state T5.

As may be observed from FIG. 5, since a failure of transfer conditions could also occur while the paired vehicles are in paired state P3 before reaching paired state P4, such circumstance would, at that time, likewise result in a regression from paired state P3 back to paired state P2.

Inasmuch as the proper positioning of grain transport GT1 relative to harvester CH1 is of great significance in effecting an unloading operation, a failure or other disconnection of the unified speed and positioning control will typically require even more substantive operational recycling by harvester CH1 and grain transport GT1 before unloading can be recommenced. In the event of such a failure or disconnection while the paired vehicles are in any of paired states P2 through P4, the paired vehicles will proceed back to paired state P1, with harvester CH1 proceeding back to harvester state H4 and grain transport proceeding back to grain transport state T4, as signified by the legends UNIFIED_CONTROL_FAIL associated with the dotted link leads from paired states P2, P3, and P4 back to paired state P1.

With a system embodiment whose state flow is as depicted in FIG. 5, such interruptions in the unloading operation and re-commencement of such actual unloading operation need not result in a termination or dissolution of the paired relationship between harvester CH1 and grain transport GT1, and such vehicles may remain paired during the unloading interruption. Other circumstances may, however, be of such consequence that a termination or dissolution of such paired relationship will result.

In such regard, with a system embodiment whose state flow is as depicted in FIG. 5, if, for any reason, an abortion of the process resulting from submission of an unload request by harvester CH1 is determined, at any point in such process, by either an operator of the vehicles or by the system, to be appropriate, desirable, or necessary, the paired relationship between harvester CH1 and grain transport GT1 will be dissolved. By way of illustration only, and not of limitation, abortion of such process, such as because of equipment failure or adverse weather or adverse topographical conditions, may be deemed circumstances that would require dissolution of the paired relationship, with harvester CH1 and grain transport GT1 proceeding from the states in which they were operating to their respective independent states H2 and T2, as signified by the brackets encompassing states H3 through H7 and T3 through T7 and the dotted link leads therefrom to states H2 and T2 with the associated legends ABORT.

As may be observed from FIG. 5 and as will be appreciated based upon the foregoing discussions, in the event of an abortion event, harvester CH1 would thus recycle to state H2 and grain transport would recycle to state T2. In order for unloading of harvester CH1 to thereafter occur, harvester CH1 would have to submit a new unload request so as to re-initiate the actions and processes leading to unloading of harvester CH1 and harvester CH1 and grain transport GT1 would have to progress through the various states in the manners as discussed hereinbefore.

Somewhat similarly, if at any time, the communications link between harvester CH1 and grain transport GT1 were to fail, significant operational recycling would be necessary. In such event, in accordance with FIG. 5, harvester CH1 and grain transport GT1 would recycle from the states in which that were operating at the time of the communication link failure back to their respective states H1 and T1, as signified by the brackets encompassing states H2 through H7 and T2 through T7 and the dotted link leads therefrom to states H1 and T1 with the associated legends COMM_LINK_BAD. As may be observed from FIG. 5, in such event, a good communications link would again need to be established before further actions.

Even more critically, if V2V communications of a vehicle were to become disabled, such as by the operator of a vehicle operating a V2V control thereof to disable V2V communications by such vehicle, substantially total recycling of operations, at least by the vehicle whose V2V communications became disabled, would be required. For example, if, at any time, while V2V communications of grain transport GT1 remain enabled, the V2V communications of harvester CH1 were to become disabled, as signified by the brackets encompassing states H1 through H7 and the dotted link lead therefrom to state H1 with the associated legend H_V2V_OFF, harvester CH1 would recycle to harvester state H0. With the V2V communications of grain transport GT1 remaining enabled at such time, grain transport GT1 would experience a communications link failure with harvester CH1, as a consequence of which, at least relative to harvester CH1, grain transport GT1 would recycle to state T1. In state T1, grain transport GT1 could look to re-establish a communications link with harvester CH1, when and if V2V communications were to be re-enabled by harvester CH1, or to establish a communications link with other harvesters.

Likewise, if, at any time, while V2V communications of harvester CH1 remain enabled, the V2V communications of grain transport GT1 were to become disabled, as signified by the brackets encompassing states T1 through T7 and the dotted link lead therefrom to state T0 with the associated legends T_V2V_OFF, grain transport GT1 would recycle to grain transport state T0. With the V2V communications of harvester CH1 remaining enabled at such time, harvester CH1 would experience a communications link failure with grain transport GT1, as a consequence of which, at least relative to grain transport GT1, harvester CH1 would recycle to state H1, as discussed hereinbefore. In state H1, harvester CH1 could look to re-establish a communications link with grain transport GT1, when and if V2V communications were to be re-enabled by grain transport GT1, or to establish a communications link with other grain transports.

Those skilled in the art will recognize and understand that the various states depicted in FIG. 5 are generally representational of broadly considered states and that there may be greater or lesser distinctions between various of the states depending upon the particular systems with which they may be associated, with certain of the states possibly encompassing a number of sub-states. Moreover, such FIG. 5 is considered to present but a single possible state-flow sequence that might be employed with or incorporated into a system of the present invention, and other sequencing of events and flows through various states may be equally as well utilized or employed.

While various techniques and equipment may be employed to determine the positionings of the vehicles, GPS positioning systems have been found to generally operate to provide accurate and reliable positioning information and may advantageously be utilized with the present invention. Consequently, oftentimes, all of the agricultural equipment depicted may, but need not, be capable of receiving transmissions from satellites or other sources for use in determining the position of such agricultural equipment, often expressed in GPS coordinates.

Accordingly, it should be appreciated and understood that the communications control portions 36 of the operating systems 20 of the various vehicles may be designed and configured to operate not only at the short distances, and to transmit and receive short distance communication signals, required by the present invention, but also, for other purposes and applications, including for determining GPS coordinates of the vehicles, in accordance with various other technologies and standards that permit transmission and reception over greater distances. Consequently, it should be appreciated that such communications control portions may be so designed that they can operate, for varying purposes, in accordance with a multitude of technologies and standards, including, but not limited to, GPRS/GSM, Bluetooth, WiFi (IEEE 802.11 standard), WiMAX (IEEE 802.16 standard), satellite, ZigBee, DSRC, and UHF/VHF, to name but a few.

Notwithstanding the foregoing, for the present invention such communications control portions must be so operable to be able to transmit and receive short distance communications signals so as to permit or provide for point-to-point communications between the involved vehicles over a short range. Consequently, depending upon the technology and standards employed, as well as the particular hardware/firmware/software components, adjustments to the broadcast range of the signals may also be made available to users of the equipment, including an ability to more greatly limit even the range of short distance signals when two vehicles have been moved closely adjacent to one another during an unloading operation. Such range adjustment or limitation, especially if coupled with various communication security features, which may include various encryption techniques as well as signal hopping technologies, can be advantageously utilized to better secure the communications between the involved vehicles against unauthorized intrusions or the distribution of information or data to unauthorized and non-involved machines or personnel.

While the foregoing discussion has most specifically addressed the unloading of grain from a harvester to a grain transport, it should be understood and appreciated that the present invention is not limited to such types of vehicles and to grain unloading, but may be advantageously employed with various transferor-type and transferee-type vehicles, including semi-trailer transporters, for coordinating the transfer therebetween of various, generally crop, materials.

In light of all the foregoing, it should thus be apparent to those skilled in the art that there has been shown and described a system and method employing short range communications for interactively coordinating material transfer operations between a transferor-type vehicle and a transferee-type vehicle. However, it should also be apparent that, within the principles and scope of the invention, many changes are possible and contemplated, including in the details, materials, and arrangements of parts and the sequences of operation which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system employing short range communications for interactively coordinating and effecting crop material transfer operations between a pair of agricultural vehicles, comprising
at least one agricultural vehicle of a first vehicle type configured to have a crop material holding bin in which crop material may be retained and crop material transfer apparatus operable to effect the transfer of the retained crop material out of said crop material holding bin, said vehicle designated as a transferor type vehicle,
at least one agricultural vehicle of a second vehicle type configured to have a crop material receptor bin into which crop material may be deposited during a crop material transfer operation, said vehicle designated as a transferee type vehicle,
each of said transferor type and transferee type vehicles having an operating system that includes an operator interface portion, a sensor input portion, a master machine control portion, and an operation performance portion, said master machine control portion operatively connected to said operator interface portion, said sensor input portion, and said operation performance portion, said operator interface portion including operator input controls operable to provide operator input data to said master machine control portion, said sensor input portion operable to monitor certain operational conditions and to provide sensor input data to said master machine control portion, said output performance portion operable to effect performance of certain actions by such individual agricultural vehicle under control of said master machine control portion thereof, each said individual agricultural vehicle also having associated therewith a communications control portion operable to transmit and receive short distance communication signals, said communications control portion operatively connected to said master machine control portion to effect the communication therefrom and thereto of communications data, said master machine control portion responsive to said data provided thereto from said operator interface portion, said sensor portion, and said communications control portion to establish operational parameters for said individual agricultural vehicle, at least a portion of which operational parameters define a logistical data set, said transferor-type vehicle and said transferee-type vehicle each being individually operable to enable vehicle to vehicle communications, designated V2V communications, thereby, each vehicle that is so operated to enable V2V communications thereby being a V2V enabled vehicle, said V2V enabled transferor-type vehicles and said V2V enabled transferee-type vehicles when located within a given area and positioned with respect to one another to be within range of said short distance communication signals, communicating with one another to exchange data, including logistical data sets, on a point to point basis and to negotiate and establish a linked pairing between a V2V enabled transferor-type vehicle and a V2V enabled transferee-type vehicle for the purpose of effecting a transfer of crop material from the linked transferor-type vehicle to the linked transferee-type vehicle, said linked transferor type vehicle and linked transferee type vehicle defining a linked vehicle pair having a paired short range communication link therebetween, to establish a unified speed and positioning control for said linked vehicle pair and to effect a positioning of said linked transferee type vehicle closely adjacent to said linked transferor type vehicle suitable for transfer of crop material from said linked transferor type vehicle to said linked transferee type vehicle and the maintenance of said relative positioning therebetween, such positioning designated a transfer position, to determine, when said linked vehicle pair are in said transfer position, the continuing viability of conditions for the transfer of crop material from said linked transferor type vehicle to said linked transferee type vehicle, to commence, when conditions for the transfer of crop material from said linked transferor type vehicle to said linked transferee type vehicle are determined to be viable, a transfer of crop material from said linked transferor type vehicle to said linked transferee type vehicle, said operating systems of said linked vehicle pair further interactively communicating with one another during said crop material transfer, with said operating systems of said linked transferor type vehicle and said linked transferee type vehicle monitoring the continuing viability of conditions suitable for the transfer of crop material and to automatically terminate crop material transfer therebetween in the event of detection of non viability of conditions suitable for the continued transfer of crop material, at least one of said operating systems of said linked transferor type vehicle and said linked transferee type vehicle also automatically effecting a termination of crop material transfer therebetween in response to at least one sensor input indicative of a crop material transfer completion condition, and said linked transferor type vehicle and said linked transferee type vehicle additionally being responsive to vehicle operator inputs to effect a termination of crop material transfer therebetween, whereby crop material may be transferred between a pair of agricultural vehicles that employ short range communications therebetween to interactively exchange data to coordinate the crop material transfer.

2. The system of claim 1 wherein said transferor type vehicles and said transferee type vehicles are operable to perform different agricultural actions.

3. The system of claim 2 wherein said transferor type vehicles include combine harvesters and said transferee type vehicles include grain transports.

4. The system of claim 1 wherein
said crop material holding bins of said transferor type vehicles include bin fill level sensors,
the fill level of said crop material holding bins is included within said logistical data set for said transferor type vehicles,
a sensed empty fill level of crop material within said crop material holding bins of said linked transferor type vehicle during crop transfer is considered a crop material transfer completion condition.

5. The system of claim 1 wherein
said crop material receptor bin of said linked transferee type vehicle includes a bin fill level sensor,
the fill level of said crop material receptor bin is included within said logistical data set for said linked transferee type vehicle,
a sensed empty full level of crop material within said crop material receptor bin of said linked transferee type vehicle during crop transfer is considered a crop material transfer completion condition.

6. The system of claim 1 wherein said transferor type vehicles and said transferee type vehicles each include as part of said sensor input portions position determination systems for determining the position of said individual agricultural vehicle and said position is included within said logistical data set for said individual agricultural vehicle.

7. The system of claim 6 wherein upon determining a loss of position data of an agricultural vehicle of said linked vehicle pair at least one of said operating systems establishing a non-viable condition for crop transfer.

8. The system of claim 1 wherein upon determining a loss of said paired short range communications link at least one of said operating systems establishing a non-viable condition for crop transfer.

9. The system of claim 1 wherein
said master machine control includes a processor and a control program therefor, and
said operating system includes, associated with and distributed among said master machine control portion and said communications control portion, a communicator module and a communications conditioning module,
said communicator module being operable to control the transmission and reception of wireless communications signals by said communications control portion,
said communications conditioning module being operable to condition and link control and data signals provided from said master machine control portion of said operating system to said communicator portion of said communications control portion and to link and decipher control and data signals received by said master machine control portion from said communicator portion.

10. The system of claim 9 wherein said communicator portion of said communications control portion includes a baseband control portion, a link manager portion, a host controller interface portion, and a transport portion.

11. The system of claim 10 wherein said communications conditioning module includes a transport layer associatable with the transport portion of said communicator portion, a host controller interface driver portion associatable with the host controller interface portion of said communicator portion, and a high level driver portion that serves as a link between the control program for said processor and said host controller interface driver portion and said transport layer portion.

12. The system of claim 11 wherein said communications control portion includes said communicator module and said master machine control portion includes said communications conditioning module.

13. The system of claim 9 wherein said short distance communications signals are microwave signals.

14. The system of claim 13 wherein said microwave signals are associated with frequencies in the low gigahertz range.

15. The system of claim 9 wherein said communications control portion is configurable by a user to limit the broadcast range of said short distance communications signals.

16. The system of claim 1 wherein said operator interface portion is operable by an operator of said agricultural vehicle to enable and disable V2V communications by such agricultural vehicle.

17. The system of claim 16 wherein upon disabling of V2V communications for a given agricultural vehicle the operating system effecting a termination of any linked pairing of said given agricultural vehicle with other agricultural vehicles and any in-process unified actions by said given agricultural vehicle with any other agricultural vehicle with which said given agricultural vehicle had been paired.

18. The system of claim 1 wherein said operator interface portion is operable by an operator of said transferor-type vehicle to effect transmission of a crop material transfer request and said negotiation between said transferor-type vehicle and said transferee-type vehicle towards establishment of said linked pairing between said transferor-type vehicle and said transferee-type vehicle is responsive to said crop material transfer request.

19. The system of claim 1 wherein said communications control portion is operable to also selectively transmit to and receive from other equipment longer distance communication signals for given purposes.

20. The system of claim 19 wherein said transferor type vehicles and said transferee type vehicles each include as part of said sensor input portions GPS position determination systems for determining the GPS position of said individual agricultural vehicle and said longer distance communications signals are utilized with said GPS determination systems.

21. The system of claim 1 wherein said operator interface portion is operable by an operator of said agricultural vehicle to abort an in-process crop material transfer, said abortion of said in-process crop material transfer effecting a termination of said linked pairing of said linked transferor-type vehicle and said transferee-type vehicle and in-process unified actions thereof.

22. A method for interactively coordinating and effecting crop material transfer operations between a pair of agricultural vehicles, comprising
providing at least one agricultural vehicle of a first vehicle type configured to have a crop material holding bin in which crop material may be retained and crop material transfer apparatus operable to effect the transfer of the retained crop material out of said crop material holding bin, said vehicle designated as a transferor type vehicle,
providing at least one agricultural vehicle of a second vehicle type configured to have a crop material receptor bin into which crop material may be deposited during a crop material transfer operation, said vehicle designated as a transferee type vehicle,
each of said transferor type and transferee type vehicles having an operating system that includes an operator interface portion, a sensor input portion, a master machine control portion, and an operation performance portion,
said master machine control portion operatively connected to said operator interface portion, said sensor input portion, and said operation performance portion,
said operator interface portion including operator input controls operable to provide operator input data to said master machine control portion,
said sensor input portion operable to monitor certain operational conditions and to provide sensor input data to said master machine control portion,
said output performance portion operable to effect performance of certain actions by such individual agricultural vehicle under control of said master machine control portion thereof,
each said individual agricultural vehicle also having associated therewith a communications control portion operable to transmit and receive short distance communication signals, said communications control portion operatively connected to said master machine control portion to effect the communication therefrom and thereto of communications data,
said master machine control portion responsive to said data provided thereto from said operator interface portion, said sensor portion, and said communications control portion to establish operational parameters for said individual agricultural vehicle, at least a portion of which operational parameters define a logistical data set,
said transferor type vehicle and said transferee type vehicle each being individually operable to enable vehicle to vehicle communications, designated V2V communications, thereby, each vehicle that is so operated to enable V2V Communications thereby being a V2V enabled vehicle,
said V2V enabled transferor type vehicles and said V2V enabled transferee type vehicles operable, when located within a given area and positioned with respect to one another to be within range of said short distance communication signals, to communicate with one another, enabling a transferor type vehicle and a transferee type vehicle for V2V communications, positioning said V2V enabled transferor-type vehicle and said V2V enabled transferee type vehicle within range of said short distance communications signals, operating said operator interface portion of said V2V enabled transferor type vehicle to effect transmission as a short distance communication signal of a crop material transfer request by said transferor type vehicle, operating said V2V enabled transferor-type vehicle and said V2V enabled transferee-type vehicle to communicate and exchange data, including logistical data sets, therebetween in order to negotiate and establish a linked pairing between said V2V enabled transferor-type vehicle and said V2V enabled transferee-type vehicle for the purpose of effecting a transfer of crop material from the linked transferor type vehicle to the linked transferee-type vehicle, said linked transferor type vehicle and linked transferee type vehicle defining a linked vehicle pair having a paired short range communication link therebetween, further operating said V2V enabled transferor type vehicle and said V2V enabled transferee type vehicle, when in said linked pairing, to communicate and exchange data between said linked vehicle pair, to establish a unified speed and positioning control for said linked vehicle pair and to effect a positioning of said linked transferee type vehicle closely adjacent to said linked transferor type vehicle suitable for transfer of crop material from said linked transferor type vehicle to said linked transferee type vehicle and the maintenance of said relative positioning therebetween, such closely adjacent positioning designated a transfer position, to determine, when said linked vehicle pair are in said transfer position, the continuing viability of conditions for the transfer of crop material from said linked transferor type vehicle to said linked transferee type vehicle, to commence, when conditions for the transfer of crop material from said linked transferor type vehicle to said linked transferee type vehicle are determined to be viable, a transfer of crop material from said linked transferor type vehicle to said linked transferee type vehicle, to communicate and exchange data between said linked vehicle pair during said crop material transfer, with said linked transferor type vehicle and said linked transferee type vehicle being operable to monitor the continuing viability of conditions suitable for the transfer, of crop material and to effect a termination of crop material transfer therebetween in the event of detection of non viability of conditions suitable for the continued transfer of crop material, said linked transferor type vehicle and said linked transferee type vehicle also being responsive to sensor inputs indicative of a crop material transfer completion condition to effect a termination of crop material transfer therebetween, and said linked transferor type vehicle and said linked transferee type vehicle additionally being responsive to vehicle operator inputs to effect a termination of crop material transfer therebetween, whereby crop material is transferable between a pair of agricultural vehicles that employ short range communications therebetween to interactively exchange data to coordinate the crop material transfer.

23. The method of claim 22 wherein said operating systems of said transferor-type vehicle and said transferee-type vehicle operate in conjunction with one another when in a linked pairing relationship.

24. The method of claim 22 wherein said transferor-type vehicle and said transferee-type vehicle are automatedly operable, upon termination of said crop material transfer, to dissolve said linked pairing between said transferor-type vehicle and said transferee-type vehicle.

25. The method of claim 22 wherein said linked vehicle pair is automatedly operable, if continuing viability of conditions for the transfer of crop material is determined to no longer exist, to effect a termination of any in process unified actions by said linked vehicle pair and dissolution of said linked pairing of said transferor-type vehicle and said transferee-type vehicle.

* * * * *